United States Patent [19]

Habermann

[11] Patent Number: 4,806,835
[45] Date of Patent: Feb. 21, 1989

[54] ELECTROMAGNETIC DEVICE FOR REDUCING VIBRATION IN A ROTARY MACHINE FITTED WITH FLUID BEARINGS

[75] Inventor: Helmut Habermann, Vernon, France

[73] Assignee: Societe Anonyme: Societe De Mecanique Magnetique, Saint-Marcel, France

[21] Appl. No.: 136,147

[22] Filed: Dec. 21, 1987

[30] Foreign Application Priority Data

Dec. 31, 1986 [FR] France ................. 86 18440

[51] Int. Cl.$^4$ ................................ G05B 1/01
[52] U.S. Cl. ........................ 318/607; 318/460; 318/632; 318/651
[58] Field of Search ........... 318/460, 629, 632, 608, 318/610, 638, 651, 607; 310/90.5

[56] References Cited

U.S. PATENT DOCUMENTS

| | | | |
|---|---|---|---|
| 4,121,143 | 10/1978 | Habermann et al. | 310/90.5 |
| 4,244,629 | 1/1981 | Habermann | 310/90.5 |
| 4,339,780 | 7/1982 | Okubo | 361/147 |
| 4,417,772 | 11/1983 | Robinson | 310/90.5 |
| 4,583,031 | 4/1986 | Brunet | 310/90.5 |
| 4,626,754 | 12/1986 | Habermann et al. | 318/661 |
| 4,642,500 | 2/1987 | Higuchi et al. | 310/90.5 |
| 4,697,128 | 9/1987 | Matsushita et al. | 310/90.5 |
| 4,763,032 | 8/1988 | Bramm et al. | 310/90.5 |

FOREIGN PATENT DOCUMENTS

2905973 2/1980 Fed. Rep. of Germany .

Primary Examiner—Benjamin Dobeck
Attorney, Agent, or Firm—Weingarten, Schurgin, Gagnebin & Hayes

[57] ABSTRACT

The electromagnetic device comprises at least one compensation ring placed in the vicinity of the fluid bearing and mounted relative to the rotor by means of an active radial magnetic bearing whose electromagnet windings are powered as a function firstly of the signals delivered by a position detector for detecting the position of the compensation ring relative to the rotor, and secondly of the signals delivered by at least two vibration detectors disposed on the casing of the machine and having non-parallel sensitivity axes which are perpendicular to the axis of the rotor. The signals delivered by the vibration detectors are applied to a high-gain narrow-band selective feedback circuit whose central frequency is synchronized with a reference frequency fo. The compensation ring is of relatively small mass and serves to exert a rotary compensation force on the rotor via the radial magnetic bearing, which force is equal to the centrifugal force due to the out-of-balance mass of the rotor but which is 180° out of phase relative thereto, thereby reducing casing vibration while expending little energy.

9 Claims, 3 Drawing Sheets

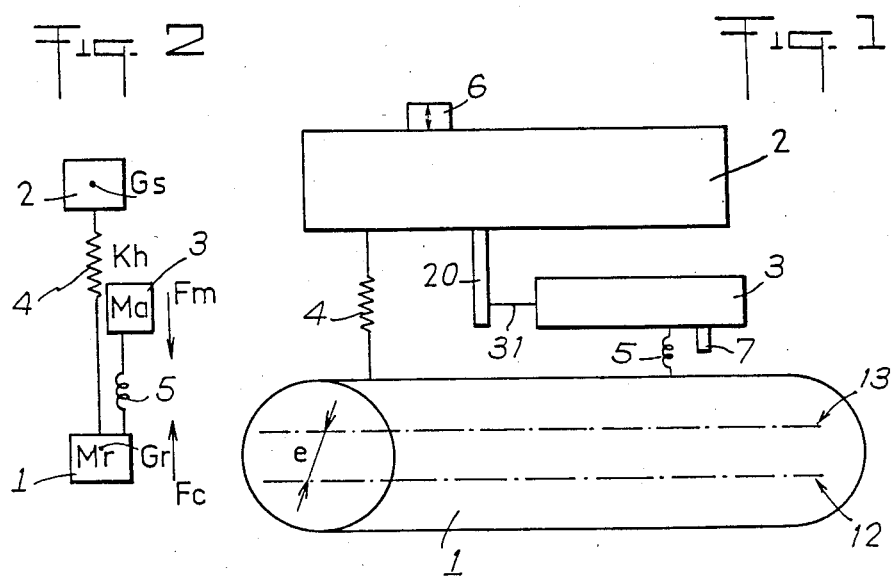
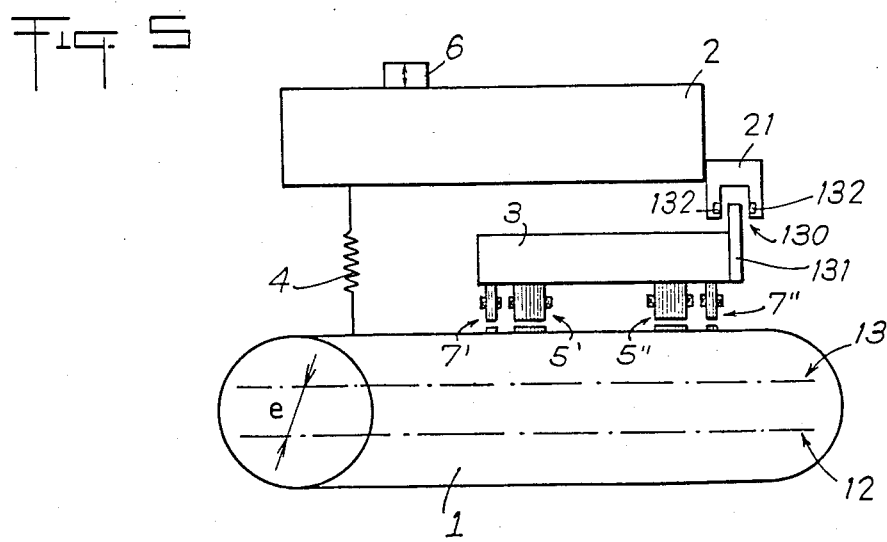

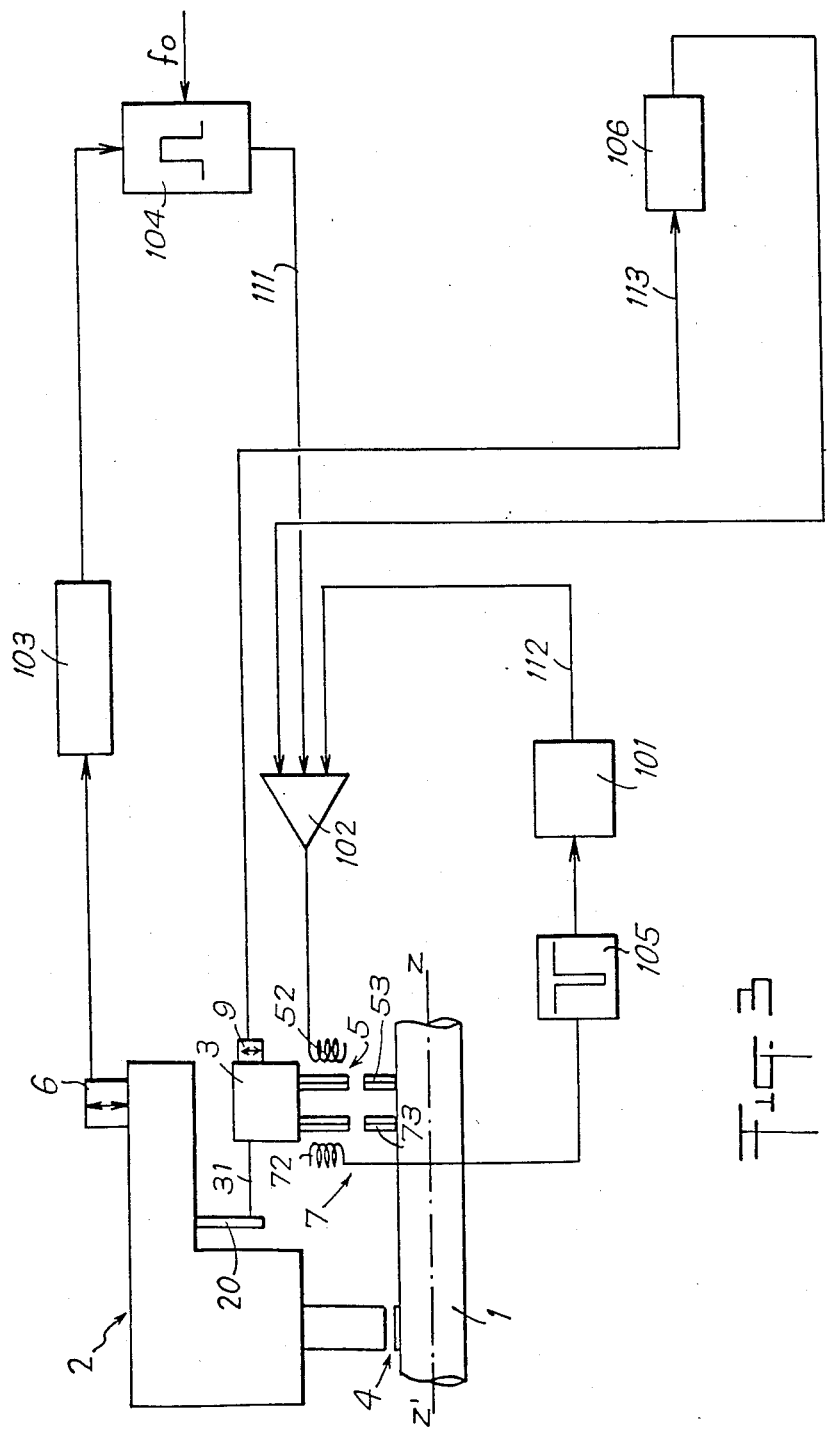

ELECTROMAGNETIC DEVICE FOR REDUCING VIBRATION IN A ROTARY MACHINE FITTED WITH FLUID BEARINGS

The present invention relates to an electromagnetic device for reducing vibration in a rotary machine having a rotor that is supported by means of at least one fluid bearing inside a casing.

BACKGROUND OF THE INVENTION

A fluid bearing, i.e. an oil bearing or a gas bearing, and in particular a hydrodynamic bearing, tends to transmit a force to its casing which is proportional firstly to the stiffness of the bearing and secondly to its eccentricity, i.e. the distance between the inertial axis of the rotor and the bearing axis. Regardless of how well the rotor is balanced, the off-balance cannot be completely eliminated. The force transmitted to the casing thus tends to cause the casing to vibrate in a manner which in many cases is detrimental to the environment in which the rotary machine is located.

To remedy this drawback, proposals have already been made to compensate the forces exerted on the casing of a machine by a hydrodynamic bearing by using electrodynamic exciters which exert active damping on the casing tending to reduce the effect of the forces exerted by the hydrodynamic bearing. Such a device which acts directly on the structure to be stabilized is not entirely satisfactory since its effect cannot avoid residual vibration and the rotating forces due to the off-balance mass applied to the casing by the hydrodynamic bearing, which forces are applied not only at the frequency rotation of the rotor, but also at frequencies which are multiples thereof, thereby making compensation all the more difficult.

U.S. Pat. No. 4,626,754 describes a device for reducing vibration in rotary machines applicable to the case where the rotor is mounted on the casing by means of an active magnetic suspension including at least one radial magnetic bearing. In this device, vibration detectors, disposed on the casing serve to reduce the vibration to which the casing is subjected by acting on the servocontrol circuits of the active magnetic bearings. Such an active magnetic suspension of the rotor could thus be juxtaposed with a fluid bearing suspension in order to compensate the disturbing forces set-up by the fluid bearing by means of the negative stiffness provided by the magnetic bearing. However, this solution suffers from drawbacks due to the fact that it cannot prevent parasitic couples appearing on the stator due to the juxtaposition of the magnetic bearings and the fluid bearings in axially offset positions, and above all due to the fact that it requires powerful magnetic bearings capable of compensating the force required to cause the rotor to rotate about its inertia axis rather than about the axis of the fluid bearing, and not just compensating the centrifugal force due to the out-of-balance mass, with the necessary compensation force being proportional to the distance between the two axes and to the stiffness of the fluid bearing, which stiffness is always very high. Further, it is necessary to compensate for harmonics that are likely to appear because of the dynamic load on the fluid bearing.

The present invention seeks to remedy the drawbacks of prior art devices and to effectively reduce or even eliminate the vibration that may be applied to the casing of a rotary machine by virtue of the machine's rotor being supported by a fluid bearing.

SUMMARY OF THE INVENTION

These aims are achieved by an electromagnetic device for reducing vibration in a rotary machine comprising a rotor mounted in a casing via at least one fluid bearing, the device comprising:
  at least one compensation ring disposed in the vicinity of the fluid bearing and mounted relative to the rotor by means of an active radial magnetic bearing;
  a position detector for detecting the position of the compensation ring relative to the rotor;
  at least two vibration detectors disposed on the casing of the machine and having nonparallel axes of sensitivity which are perpendicular to the axis of the rotor;
  said active radial magnetic bearing having electromagnetic windings which are controlled as a function of the signals delivered by said position detector and said vibration detectors;
  wherein the signals delivered by the vibration detectors are applied to a high-gain narrow-band selective feedback circuit having a central frequency synchronized with a reference frequency and including means for integrating the signals from the vibration detectors, and filter means for eliminating transient signals at frequencies unrelated to the reference frequency, thereby causing the compensation ring to exert a rotary compensation force on the rotor via the radial magnetic bearing, said compensation force being equal to the centrifugal force due to the out-of-balance mass of the rotor but being phase-shifted 180° relative thereto.

The mass of the compensation ring is much less than the mass of the rotor, and is preferably of the same order as a few percent thereof.

In an advantageous embodiment, the device includes at least three connection rods running parallel to the rotor axis and having a high degree of axial stiffness, said connection rods serving to connect the compensation ring to the casing.

In another embodiment, the device comprises a compensation ring which is mounted relative to the rotor by means of two active radial magnetic bearings and which co-operates with the casing by means of an active axial magnetic bearing.

According to a particular feature of the invention, the device further includes at least two vibration sensors having mutually nonparallel axes both perpendicular to the axis of the rotor and disposed on the compensation ring, whith the signals delivered by these vibration detectors being applied to a feedback circuit including proportional and derivative (PD) networks and connected to the windings of the electromagnets of the active magnetic bearing, and with the feedback circuit connecting the position detector for detecting the position of the compensation ring to the electromagnetic windings of the active magnetic bearing including a single integral action network (I).

In general, the presence of a relatively low mass compensation ring which is mounted relative to the rotor by means of at least one active magnetic bearing serves, with the aid of a low power magnetic bearing, to keep the casing stationary by cancelling at the root the forces generated by the rotor. As a result, no dynamic force is transmitted to the casing by the fluid bearing, while the stiffness of the fluid bearing is not modified by any variation in its gap and no disturbance is applied to the casing by the fluid bearing at a frequency which is a harmonic of the rotation frequency of the rotor. The device in accordance with the invention thus serves to choke-off disturbances at birth, and can therfore be very effective.

BRIEF DESCRIPTION OF THE DRAWINGS

Embodiments of the invention are described by way of example with reference to the accompanying drawings, in which:

FIG. 1 is a diagram showing the essential components of a device in accordance with the invention;

FIG. 2 is a symbolic diagram which is equivalent to the diagram of FIG. 1;

FIG. 3 is a diagram of the servocontrol circuits for the magnetic bearing supporting the compensation ring of the FIG. 1 device;

FIG. 5 is a diagrammatic view showing the essential components of a variant of the FIG. 1 embodiment of the invention.

MORE DETAILED DESCRIPTION

Figure 4:
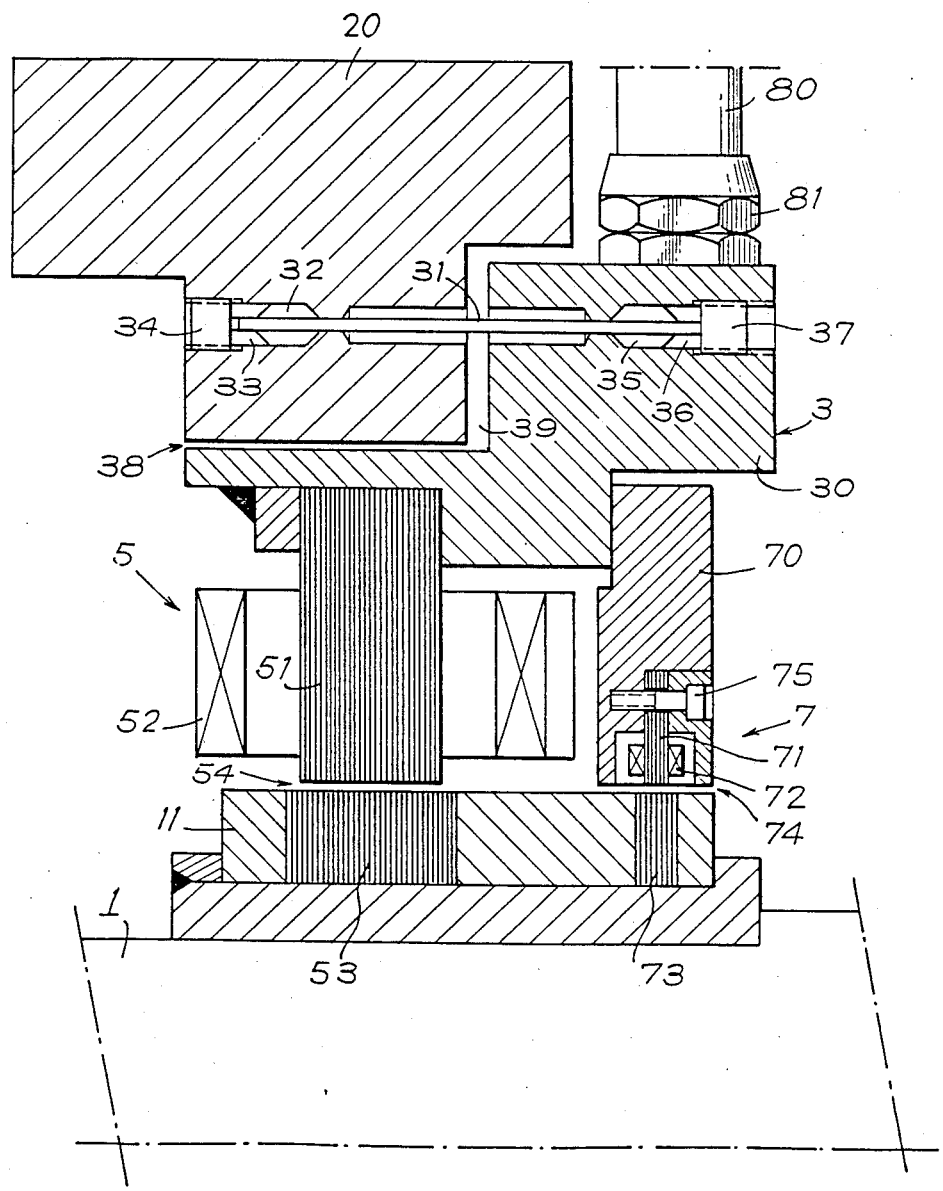
FIG. 4 is a detailed half-axial section view showing a physical embodiment of the mechanical support means and of the magnetic support means for the compensation ring of the FIG. 1 device.

FIG. 1 is a diagram showing the essential components of a rotary machine which includes a rotor 1 mounted inside a casing 2 by means of at least one fluid bearing 4 which may be a gas bearing or an oil bearing, and which may in particular be a bearing of the hydrodynamic type. In the following description, it is assumed that the bearing is of the hydrodynamic type, by way of example. The dot-dash line 12 represents the inertia axis of the rotor 1 which is different from the geometrical axis of the rotor 1, and which is offset from the axis 13 (likewise drawn in dot-dash lines) of the hydrodynamic bearing 4 by eccentricity e.

In the absence of any compensation device, the hydrodynamic bearing 4 transmits a force Fh to the casing 2, which forces is proportional to the stiffness Kh of the hydrodynamic bearing 4 and to the above-defined eccentricity e.

As can be seen in FIG. 1, a compensation ring 3 is interposed between the rotor 1 and the casing 2, and by virtue of a circular oscillating motion, it is intended to compensate the force generated on the rotor 1 by the hydrodynamic bearing, thereby avoiding any transmission of the disturbing forces to the casing 2. The compensation force applied to the rotor 1 by the ring 3 is exerted via at least one active radial magnetic bearing 5 which is servocontrolled firstly to the signals delivered by a position detector 7 for detecting the position of the rotor 1 relative to the ring 3, and secondly to signals delivered by vibration detectors 6 disposed on the casing 2. In the FIG. 1 embodiment, rods 31 having low stiffness in the radial direction serve to hold the ring 3 axially in a predetermined position relative to a support 20 which is fixed to the casing 2.

The configuration of the device in accordance with the invention is intended to keep the casing 2 still by cancelling the forces generated by the rotor 1.

The rotor 1 (which is connected to the casing solely by means of a hydrodynamic bearing 4) rotates about the axis 13 of the bearing.

The rotary force generated on the rotor 1 is thus the centrifugal force Fc due to the out-of-balance mass of the rotor 1, which force is given by:

$$Fc = (2\pi f)^2 \cdot e \cdot Mr \tag{1}$$

where:

f represents the frequency related to the speed of rotation of the rotor;

e represents the eccentricity due to the out-of-balance mass, i.e. the distance between the axis of rotation of the rotor and the inertia axis of the rotor; and Mr represents the mass of the rotor.

The servocontrol circuits for the radial magnetic bearing 5 co-operate with the detectors 6 and 7 so that the compensation ring 3 provides a rotary force Fm via the magnetic bearing 3, with the rotary force Fm being equal to the force Fc, but being 180° out of phase relative thereto.

The compensation ring 3 then performs a circular oscillating motion of amplitude $r_a$ such that:

$$r_a = e \cdot (Mr/Ma) \tag{2}$$

where:

e is the distance between the rotation axis 13 of the rotor 1 and the inertia axis 12 thereof;

Mr represents the mass of the rotor 1; and

Ma represents the mass of the compensation ring 3.

FIG. 2 shows in symbolic manner how the force Fm created by the compensation ring 3 and the magnetic bearing 5 compensates the force Fc created by the rotor 1 (whose center of gravity is Gr) by virtue of the out-of-balance mass thereof and the stresses it applies to the hydrodynamic bearing 4.

In FIG. 2, Gs represents the center of gravity of the casing 2 which is assumed to be undeformable. It can be seen that in spite of the presence of a hydrodynamic bearing 4 of stiffness Kh, no dynamic force is exerted by the bearing 4 on the casing 2, thereby effectively solving the problem set.

Reference is now made to FIG. 3 for describing in greater detail the servocontrol circuits for the active magnetic bearing 5 which keeps the compensation ring 3 in a floating position relative to the rotor 1 while producing dynamic forces opposing the out-of-balance forces created by the hydrodynamic bearing or other pseudo-bearings such as the sealing rings, for example.

The vibration detectors 6 on the casing of the machine are constituted by accelerometers or by speed detectors and comprise at least two detectors having their axes of sensitivity oriented along two directions X'X and Y'Y which are mutually perpendicular and which are also perpendicular to the axis ZZ' of the rotor 1.

FIG. 3 only shows the servocontrol loops applying to the direction X'X, which loops serve to control the current flowing through those windings 52 of the magnetic bearing 5 which act along the direction X'X. Entirely similar servocontrol loops are used for controlling the current that flows through those windings 52 of the bearing 5 which act along the direction Y'Y, on the basis of detectors whose sensitivity axis lies along the direction Y'Y.

The signals coming from the vibration detectors 6 are applied to integrator circuits 103 which perform a single integration if the detectors 6 are speed sensors, or which perform a double integration. if the detectors 6 are accelerometers.

The signals delivered by the integrator circuits 103 are then applied to a bandpass filter 104 centered on a rotation frequency fo. The frequency fo may be the rotation frequency f of the rotor 1 if the vibrations to which the casing 2 is subjected in the absence of the ring 3 are essentially constituted by the hydrodynamic bearing 4 per se. However, other auxiliary components on the rotor 1, e.g. sealing rings, may behave like pseudobearings and may set-up disturbances at frequencies 2f, 3f, ... which are harmonics of the rotation frequency of the rotor 1. It is therefore advantageous to begin by using a spectrum analyser receiving the signals provided by the vibration detectors 6 to establish which vibration frequencies are stable in the long term, with said frequencies being theoretically equal to a multiple, e.g. 2f or 3f of the speed of rotation f of the rotor, so that filters 104 can subsequently be used which are centered on the frequencies fo as determined by the Fourier analysis.

The vibration detectors 6 thus serve to control compensation of repetitive vibration coming from the rotor 1 which, in the absence of the compensation ring 3, would be applied to the casing 2.

The servocontrol loop 111 which is essentially constituted by a vibration detector 6, an integrator circuit 103, a bandpass filter 104, and an amplifier 102 feeding the windings 52 of the electromagnet of the bearing 5 constitutes a high-gain narrow-band selective feedback loop which enables the ring 3 to oscillate in such a manner as to dynamically compensate the disturbing forces created by the rotor 1. In the figure, the servocontrol loop 111 is shown as having a single output amplifier 102, however the amplifier may naturally be associated in conventional manner with phase-shifting circuits in order to feed diametrically opposite windings 52 along one or other of the directions X'X and Y'Y with antiphase signals.

The static position of the ring 3 relative to the rotor 1 is controlled by means of a conventional feedback loop 112 which receives the signals delivered by a detector 7 for detecting the position of the rotor 1 relative to the ring 3. The detector 7 may be of the inductive type and includes position detector components which are oriented along the two perpendicular directions X'X and Y'Y. Each of the two feedback loops 112 for controlling the position of the ring 3 along one or other of the directions X'X and Y'Y has a connecting network 101 for signal processing purposes, e.g. a network of the PID type (where PID stands for Proportional-plus-Integral-plus-Derivative). The signals from the correction network 101 which is generally associated with a linearizing circuit are applied to the summing amplifier 102.

A network 105 for automatically balancing the rotor 1 may be incorporated in the servocontrol loop 112 in order to prevent the position detector 7 from transmitting an error signal to the magnetic bearing 5 related to the eccentricity between the axis of the position detector 7 and the axis of rotation as defined by the hydrodynamic bearing 4. The automatic balancing network 105 may be constituted, for example, in the manner described in U.S. Pat. No. 4,121,143. The use of a good quality position detector 7, e.g. an inductive detector of the type described in U.S. Pat. No. 4,114,960, and the use of an automatic balancing network 105 ensure that the detector 7 for detecting the static position of the ring 3 relative to the rotor 1 does not give rise to disturbances relative to the dynamic servocontrol loop 111.

In a possible variant embodiment, the compensation ring 3 is spatially suspended, i.e. its position relative to the rotor 1 is determined for low frequency errors by the position detector 7, and for higher frequency errors by the vibration detectors 9 (accelerometers or speed detectors) which are placed on the ring 3 and have their sensitivity axes perpendicular to the axis of the rotor 1. The signals from the vibration detectors 9 are integrated (respectively two times or once only) and are then applied via a PD corrector network 106 to the summing amplifier 102 feeding the windings 52. Thus, each servocontrol axis X'X and Y'Y is associated with a feedback loop 113 in addition to the feedback loop 102 which receives the signals from the detector 7. In this case, the servocontrol loop 111 continues to act with respect to dynamic effects to control the force of the magnetic bearing 5 of the floating ring 3 so as to produce a compensating couple on the rotor 1, thereby avoiding the appearance of a couple on the casing 2 and thus tending to limit the vibration detected by the detectors 6 as much as possible.

FIG. 4 is a more detailed view of an example of the arrangement holding the compensation ring 3 relative to the casing 2 and to the rotor 1.

The body 30 of the compensation ring 3 supports a laminated magnetic circuit 51 which, together with its windings 52, constitutes the stator of the radial magnetic bearing 5. The rotor 1 has a ring 11 around its periphery including a laminated rotor magnetic circuit 53 disposed opposite the stator magnetic circuit 51 and defining a gap 54 which may be about one millimeter (mm) wide.

The inductive type position detector 7 has a laminated core 71 with windings 72 wound thereabout, and is disposed opposite a laminated annular magnetic circuit 73 mounted in the ring 11 fixed to the rotor 1 so as to leave a gap 74. The core 71 of the detector 7 is fixed by connection means 75 to a support 70 which is fixed to the body 30 of the compensation ring 3. The reference surface of the annular magnetic circuit 73 must naturally have a very good surface state so as to avoid disturbing measurements, and the detector 7 as a whole is disposed in the immediate proximity of the magnetic bearing 5 which is itself situated adjacent to the hydrodynamic bearing 4 whose disturbing effects are to be compensated.

The cables feeding the windings 52 of the bearing 5 and providing the connections between the windings 72 of the detector 70 and the servocontrol circuits are guided along a flexible duct 80 which is fixed to the ring 3 by a connection 81.

FIG. 4 shows a rod 31 disposed parallel to the axis of the rotor 1 and connecting the compensation ring 3 to a part 20 which is fixed to the casing 2. The connection rod 31 is rigid in the axial direction but is not very stiff in the radial direction and has the function of preventing the compensation ring 3 from moving axially and also of preventing it from rotating with the rotor. The rod 31 which is essentially intended to absorb temporary shocks may be small in diameter, e.g. one millimeter or a few millimeters, and constitutes a suspension having a resonant frequency which is low relative to the speed of rotation of the rotor. The resonant frequency of the rod suspension may thus be about 5 Hz for a rotor that rotates at 50 Hz. In order to prevent torsion, it is advantageous to provide at least three and preferably six to twelve parallel rods 31 which are disposed round the rotor 1 in order to connect the ring 3 to the casing 2. The connection rods may be fixed by various different types of mechanical system, for example they may be fixed by means of screws 34 acting via metal parts 33 for clamping damping members 32, e.g. made of plastic material, around each rod 31. As can be seen in FIG. 4, the rods may be fixed to the fixed part 20 and to the oscillating ring 3 in identical manner.

The empty space 38 extending radially between the ring support 20 and the ring 3 may be of substantially the same size as the gap 54 of the magnetic bearing 5, i.e. about one millimeter. It may be observed that when the rotor 1 moves a few micrometers radially, the compensation ring 3 may itself move through a greater distance, e.g. several hundredths or several tenths of a millimeter such that the mass of the compensation ring 3 need be only a relatively small percentage of the mass of the rotor 1.

In the examples of FIGS. 1 and 4, it has been assumed that the compensation ring 3 is supported by an active radial magnetic bearing 5 and is held radially by mechanical means 31. However, as shown diagrammatically in FIG. 5, it is possible to use a floating compensation ring 3 which is supported solely by magnetic means having five degrees of freedom. In this case, the ring 3 may be supported radially relative to the rotor 1 by two radial magnetic bearings 5' and 5" similar to the magnetic bearing 5 shown in FIGS. 1 and 4 and each cooperating with a radial detector 7' or 7" similar to the detector 7 of FIGS. 1 and 4. Each of the radial bearings 5' and 5" is naturally also servocontrolled to the signals delivered by the vibration detectors 6 as is the case in FIG. 3. A magnetic axial abutment 130 including a magnetic circuit 131 fixed to the ring 3 and electromagnetic windings 132 fixed to a support 21 which is fixed to the casing 2 so as to co-operate with the magnetic circuit 131 serves to hold the ring 3 instead of the connection rods 31 of the embodiment shown in FIGS. 1 and 4.

In the above description it has been assumed that the compensation ring 3 which is mounted relative to the rotor by magnetic means serves only to compensate forces due to the presence of the rotor 1 being out of balance. However, the combination of a compensation ring 3 and a fluid bearing 4 is advantageous for other reasons also since it makes it possible to limit the vibrations occurring at the casing 2 due to causes other than the mere presence of an out-of-balance mass.

Thus, if a long shaft 1 is supported by at least three fluid bearings 4, and even if the long shaft 1 is ideally balanced, it is not possible, in practice, to place the bearing surfaces of the various bearings on exactly the same axis. As a result, a crank-shaft effect is produced at each bearing 4. Overall, the crank-shaft effects due to the various bearings 4 cancel one another, however they apply bending forces to each casing 2 by virtue of the fluid bearings 4 tending to twist the shaft 1 so as to bring it into alignment with each of the initially misaligned bearing surfaces. I.e. the bearing surfaces are not concentric. This contributes to setting up detrimental vibrations on the casings 2.

The presence of compensation rings 3 associated with each fluid bearing 4 and mounted on the shaft 1 by means of active magnetic bearings 5 makes is possible to compensate the various crank-shaft effects by acting on the shaft so as to cause it to be straight and by bringing the various bearing surfaces of the fluid bearings 4 into mutual alignment without acting on the fluid bearings, thus without setting up vibrations in the casings 2.

For example, the case may be considered of a shaft 1 which is 5 meters (m) long, 200 mm in diameter, with an unequipped mass of 1,000 kg, an equipped mass of 4,000 kg, and a speed of rotation of 100 Hz.

If the manufactured eccentricity of each bearing surface of a fluid bearing is 100 micrometers, and if the bending stiffness is 10N per micrometer, the force required for straightening the shaft is 1,000N. If this force is exerted by conventional fluid bearings without a compensation ring, detrimental vibrations are automatically applied to the casing of the machine and the forces to be exerted which are related to the stiffness of the fluid bearings (which may be 500N per micrometer) are very high. However, if compensation rings 3 such as those described with reference to FIGS. 1 and 3 to 5 are combined with the various fluid bearings, the bearing surfaces of the various fluid bearings can be put into alignment using little energy and minimizing reactions on the casings.

In the above numerical example of an eccentricity of 100 micrometers for a shaft 1 rotating at a speed of 100 Hz, a compensation ring 3 having a mass of 100 kg for example may oscillate with an amplitude of 25 micrometers in order to compensate the crank-shaft effect created by the fluid bearing whose bearing surface is 100 microns off-center.

If a long shaft is suspended by a central fluid bearing and two end fluid bearings, compensation rings 3 having different masses may be associated with the various bearings. Thus, the mass of the compensation ring associated with the central fluid bearing may be twice the mass of each of the compensation rings associated with the end fluid bearing.

I claim:

1. An electromagentic device for reducing vibration in a rotary machine comprising a rotor mounted in a casing via at least one fluid bearing, the device comprising:
    at least one compensation ring disposed in the vicinity of the fluid bearing and mounted relative to the rotor by means of an active radial magnetic bearing;
    a position detector for detecting the position of the compensation ring relative to the rotor;
    at least two vibration detectors disposed on the casing of the machine and having nonparallel axes of sensitivity which are perpendicular to the axis of the rotor;
    said active radial magnetic bearing having electromagnetic windings which are controlled as a function of the signals delivered by said position detector and said vibration detectors;
    wherein the signals delivered by the vibration detectors are applied to a high-gain narrow-band selective feedback circuit having a central frequency synchronized with a reference frequency and including means for integrating the signals from the vibration detectors, and filter means for eliminating transient signals at frequencies unrelated to the reference frequency, thereby causing the compensation ring to exert a rotary compensation force on the rotor via the radial magnetic bearing, said compensation force being equal to the centrifugal force due to the out-of-balance mass of the rotor but being phase-shifted by 180° relative thereto.

2. A device according to claim 1, wherein the mass of the compensation ring is much less than the mass of the rotor, and is preferably of the order of a few percent thereof.

3. A device according to claim 1, including at least three connection rods running parallel to the rotor axis and having a high degree of axial stiffness, said connection rods serving to connect the compensation ring to the casing.

4. A device according to claim 3, wherein the connection rods are of small diameter, of the order of a few millimeters, so as to present negligible radial stiffness compared with the stiffness of the active magnetic bearing, and to have a resonant frequency which is much less than the speed of rotation of the rotor.

5. A device according to claim 1, wherein the reference frequency is determined by Fourier analysis.

6. A device according to claim 1, further including at least two vibration sensors having mutually nonparallel axes both perpendicular to the axis of the rotor and disposed on the compensation ring, wherein the signals delivered by these vibration detectors are applied to a feedback circuit including proportional and derivative (PD) networks and connected to the windings of the electromagnets of the active magnetic bearing, and wherein the feedback circuit connecting the position detector for detecting the position of the compensation ring to the electromagnetic windings of the active magnetic bearing including a single integral action network (I).

7. A device according to claim 1, wherein the feedback circuit connecting the position detector for detecting the position of the compensation ring to the electromagnet windings of the active magnetic bearing and determining the static position of the ring include a circuit for automatically balancing the rotor by creating a gain "hole" centered on a frequency which is a direct function of the speed of rotation of the rotor.

8. A device according to claim 1, wherein the vibration detectors are constituted by accelerometers or speed sensors.

9. A device according to claim 1, including a compensation ring which is mounted relative to the rotor by means of two active radial magnetic bearings and which co-operates with the casing by means of an active axial magnetic bearing.

* * * * *